(12) United States Patent
Imamura

(10) Patent No.: US 8,041,173 B2
(45) Date of Patent: Oct. 18, 2011

(54) MULTI-CORE OPTICAL FIBER HAVING ALIGNMENT MARKERS

(75) Inventor: Katsunori Imamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/846,028

(22) Filed: Jul. 29, 2010

(65) Prior Publication Data

US 2010/0296784 A1 Nov. 25, 2010

Related U.S. Application Data

(63) Continuation of application No. PCT/JP2009/068908, filed on Nov. 5, 2009.

(30) Foreign Application Priority Data

Dec. 24, 2008 (JP) ................................. 2008-327924

(51) Int. Cl.
 *G02B 6/02* (2006.01)
(52) U.S. Cl. ...................................... 385/126; 385/125
(58) Field of Classification Search .................. 385/123, 385/125, 126
 See application file for complete search history.

(56) References Cited

U.S. PATENT DOCUMENTS

| | | | |
|---|---|---|---|
| 7,082,242 B2 * | 7/2006 | Fajardo et al. ................ 385/127 |
| 7,492,999 B2 | 2/2009 | Imamura | |
| 7,609,928 B2 | 10/2009 | Imamura | |
| 7,613,374 B2 | 11/2009 | Imamura | |
| 7,657,141 B2 | 2/2010 | Imamura | |
| 7,693,379 B2 | 4/2010 | Imamura | |
| 7,742,671 B2 | 6/2010 | Koyamada et al. | |
| 7,773,845 B2 | 8/2010 | Imamura | |
| 2008/0219667 A1 | 9/2008 | Imamura | |
| 2009/0046984 A1 | 2/2009 | Mukasa | |
| 2009/0067793 A1 | 3/2009 | Bennett et al. | |
| 2009/0324242 A1 | 12/2009 | Imamura | |
| 2010/0054742 A1 | 3/2010 | Imamura | |
| 2010/0150507 A1 | 6/2010 | Takahashi et al. | |

FOREIGN PATENT DOCUMENTS

| | | |
|---|---|---|
| JP | 2003-201140 | 7/2003 |
| JP | 2005-070461 | 3/2005 |
| JP | 2008-534995 | 8/2008 |
| WO | WO 2008/093870 | 8/2008 |

OTHER PUBLICATIONS

Mulit-core holey fibers for ultra large capacity wide-band transmission, K. Imamura, et al., Proceedings of the Society Conference of IEICE, Sep. 2, 2008, 4 pages (with English translation).
U.S. Appl. No. 12/843,302, filed Jul. 26, 2010, Imamura.
U.S. Appl. No. 12/846,113, filed Jul. 29, 2010, Takahashi, et al.
U.S. Appl. No. 13/045,039, filed Mar. 10, 2011, Imamura.

* cited by examiner

*Primary Examiner* — Uyen Chau N Le
*Assistant Examiner* — Michael Mooney
(74) *Attorney, Agent, or Firm* — Oblon, Spivak, McClelland, Maier & Neustadt, L.L.P.

(57) ABSTRACT

A multi-core optical fiber includes: a plurality of core portions; and a cladding portion positioned around the plurality of core portions and including a marker for identifying a position of a specific one of the plurality of core portions.

5 Claims, 8 Drawing Sheets

MULTI-CORE OPTICAL FIBER HAVING ALIGNMENT MARKERS

CROSS-REFERENCE TO RELATED APPLICATIONS

This application is a continuation of PCT International Application No. PCT/JP2009/068908 filed on Nov. 5, 2009 which claims the benefit of priority from Japanese Patent Application No. 2008-327924 filed on Dec. 24, 2008, the entire contents of which are incorporated herein by reference.

BACKGROUND OF THE INVENTION

1. Field of the Invention

The present invention relates to a multi-core optical fiber having a plurality of core portions.

2. Description of the Related Art

As means for remarkably increasing communication capacity, multi-core optical fibers, each having a plurality of core portions, have been disclosed.

As one type of the multi-core optical fibers, a multi-core holey fiber is disclosed (see Japanese National Publication of International Patent Application No. 2008-534995). This holey fiber is an optical fiber that has core portions and a cladding portion positioned around the core portions and having a plurality of holes arranged around the core portions. In the holey fiber, an average refractive index of the cladding portion is reduced by the holes, and the principle of total reflection of light is utilized to confine the light to the core portions and to propagate the light (see International Publication Pamphlet No. WO2008/093870). Because the refractive index is controlled by the holes, the holey fiber is able to realize endlessly single mode (ESM) characteristics realizing single mode transmission at all wavelengths and unique properties such as anomalous dispersion at shorter wavelengths. A multi-core holey fiber is a holey fiber having a plurality of core portions, and is thought of as being possible to realize SDM transmission in addition to the ESM characteristics.

DISCLOSURE OF INVENTION

Problem to be Solved by the Invention

When the multi-core optical fiber is connected to another multi-core optical fiber or to an optical device by fusion splicing or the like, it is necessary to connect a specific core portion of the multi-core optical fiber and a specific core portion of the another multi-core optical fiber or the optical device.

However, if the plurality of core portions is symmetrically arranged with respect to a central axis in the multi-core optical fiber, there is a problem that it is difficult to identify the specific core portion by the appearance.

SUMMARY OF THE INVENTION

It is an object of the present invention to at least partially solve the problems in the conventional technology.

According to an aspect of the present invention, a multi-core optical fiber includes: a plurality of core portions; and a cladding portion positioned around the plurality of core portions and including a marker for identifying a position of a specific one of the plurality of core portions.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a multi-core optical fiber according to the present invention will be explained in detail below with reference to the drawings. The present invention is not limited by the embodiments. In addition, those terms, which are not particularly defined in this specification, follow the definitions and measurement methods defined by ITU-T (International Telecommunication Union Telecommunication Standardization Sector) G.650.1.

First Embodiment

Figure 1:
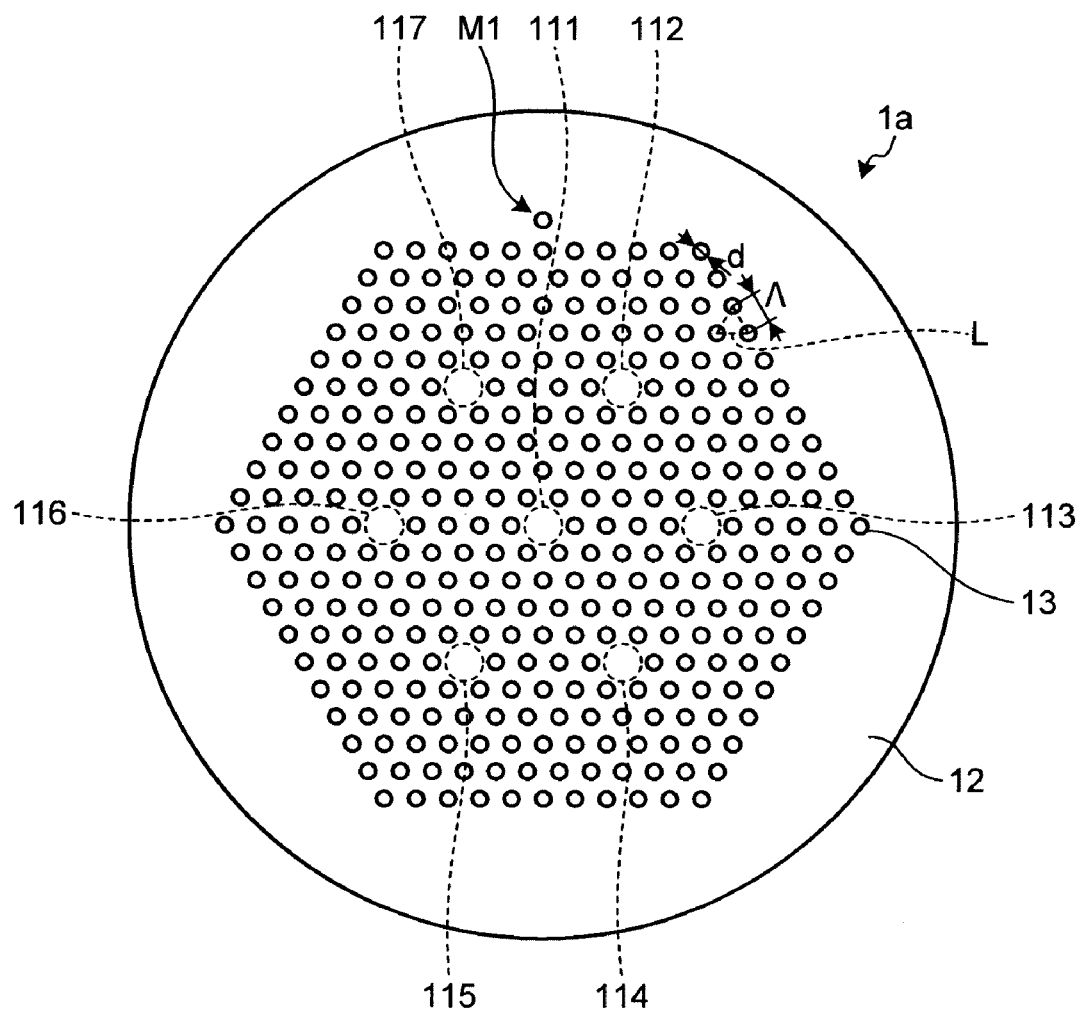
FIG. 1 is a schematic cross-sectional view of a multi-core HF according to a first embodiment.

FIG. 1 is a schematic cross-sectional view of a multi-core holey fiber (multi-core HF) according to a first embodiment of the present invention. As illustrated in FIG. 1, a multi-core HF 1a includes core portions 111 to 117 arranged separated from each other and a cladding portion 12 positioned around the core portions 111 to 117. The core portions 111 to 117 and the cladding portion 12 are made of silica-based glass such as pure silica glass not containing any dopant for adjusting the refractive index.

The core portion 111 is arranged at an approximate center portion of the cladding portion 12, and the core portions 112 to 117 are arranged at respective apexes of an equilateral hexagon around the core portion 111. The cladding portion 12 includes a plurality of holes 13 periodically arranged around the core portions 111 to 117. The holes 13 are arranged so as to form a triangular lattice L, and form equilateral hexagonal layers so as to surround each of the core portions 112 to 117. Moreover, in the multi-core HF 1a, the core portions 111 to 117 are surrounded by the holes 13 of at least five-layers, and four holes 13 are each present between the core portions 111 to 117. The cladding portion 12 includes a marker M1 being a hole formed outside an area in which the holes 13 are formed and on an outer side of the core portion 112 and the core portion 117. The marker M1 is located at a position at approximately equal distances from the core portion 112 and the core portion 117.

The multi-core HF 1a is configured to confine light to each of the core portions 111 to 117 by the holes 13 to propagate the light. A diameter d [μm] of the holes 13 and a lattice constant Λ [μm] of the triangular lattice L are not particularly limited and, thus, are set appropriately according to desired optical characteristics. For example, if d/Λ is 0.35 to 0.65 and Λ is 10 μm, then similarly to the HF disclosed in International Publication Pamphlet No. WO2008/093870, ESM characteristics are realized for each of the core portions 111 to 117 at least at a wavelength of 1260 nm to 1610 nm. Furthermore, at a wavelength of 1550 nm, an effective core area Aeff becomes large at approximately 114.6 μm², and a bending loss upon bending with a diameter of 20 mm becomes small at approximately 1.6 dB/m, and thus, an optical fiber with reduced optical nonlinearity and suitable for cabling is realized.

In the conventional multi-core HF, because the core portions are symmetrically arranged with respect to a central axis thereof, it is difficult to identify a specific core portion by the appearance. However, as explained above, because the cladding portion 12 of the multi-core HF 1a has the marker M1, a specific core portion is easily identified on the basis of the location of the marker M1. The marker M1 is a hole, the diameter thereof is not particularly limited, and the diameter may be, for example, approximately 1.0 μm to 10.0 μm. Furthermore, if present outside the area in which the holes 13 are formed, like the marker M1, the marker M1 does not affect confinement of the light to the core portions 111 to 117 by the holes 13, and thus the optical characteristics of the multi-core HF 1a is not changed.

As explained above, because the cladding portion 12 of the multi-core HF 1a includes the marker M1, identification of a specific core portion of the core portions 111 to 117 becomes easy, and thus connection to another multi-core optical fiber becomes easy.

If, for example, the multi-core HFs 1a are to be connected to each other using fusion splicing, connector connection, or mechanical splice connection, the following method, for example, is used. Specifically, in a state in which end faces of, for example, two multi-core HFs 1a are placed opposite to each other, a mirror or a prism is inserted between the end faces of the two multi-core HFs 1a. Then, at least one of the two multi-core HFs 1a is rotated around the central axis while the end faces of the two multi-core HFs 1a which have become observable from the outside by the mirror or the prism are being observed, and on the basis of the positions of the markers M1, a rotational position is determined so that, for example, the core portions 112 are connected to each other. Thereafter, the two multi-core HFs 1a are connected to each other.

In the connection method, light may be passed through a specific core portion, for example, a core portion 112 of one of the multi-core HFs 1a, and a light receiver may be connected to a core portion 112 at an end face on an opposite side of a to-be-connected-to end face of the other multi-core HG 1a, and then connection may be performed while intensity of the light received by the light receiver is being monitored. In this case, by using the markers M1 for coarse adjustment of rotational positions of the two multi-core HFs 1a, and performing fine adjustment of the rotational positions by a light intensity monitor, it is possible to achieve quick and easy coarse adjustment and accurate fine adjustment.

(First Modification)

Figure 2:
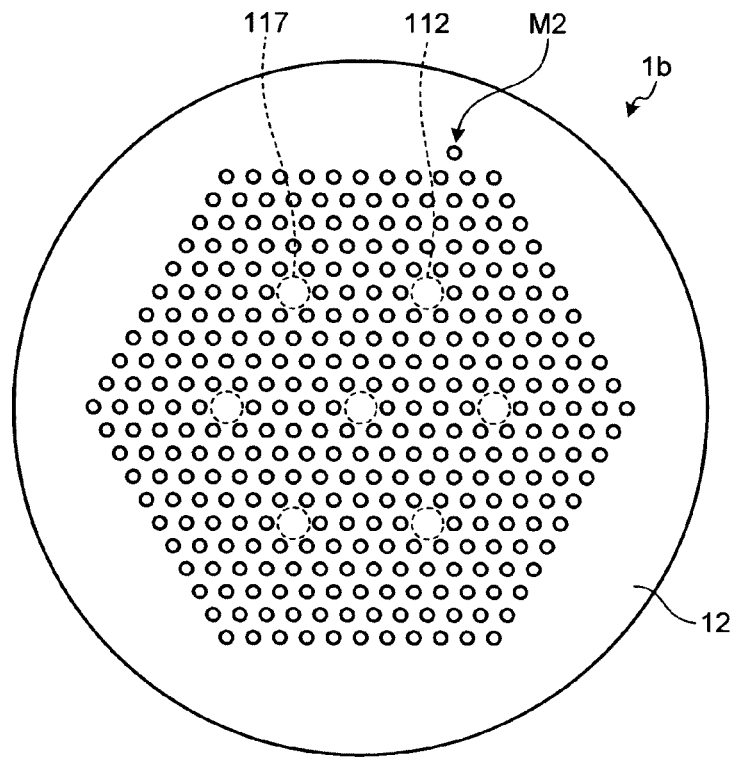
FIG. 2 is a schematic cross-sectional view of a multi-core HF according to a first modification.

Next, first to sixth modifications of the multi-core HF 1a according to the first embodiment will be explained below. FIG. 2 is a schematic cross-sectional view of a multi-core HF 1b according to the first modification. As illustrated in FIG. 2, the multi-core HF 1b has a configuration in which the marker M1 of the multi-core HF 1a illustrated in FIG. 1 is replaced with a marker M2. The marker M2 is a hole similar to the marker M1, but is located closer to the core portion 112 than to the core portion 117. As a result, in the multi-core HF 1b, it is possible to identify a specific direction around a periphery of the cladding portion 12, for example, a direction from the core portion 117 toward the core portion 112 by the marker M2.

Figure 3:
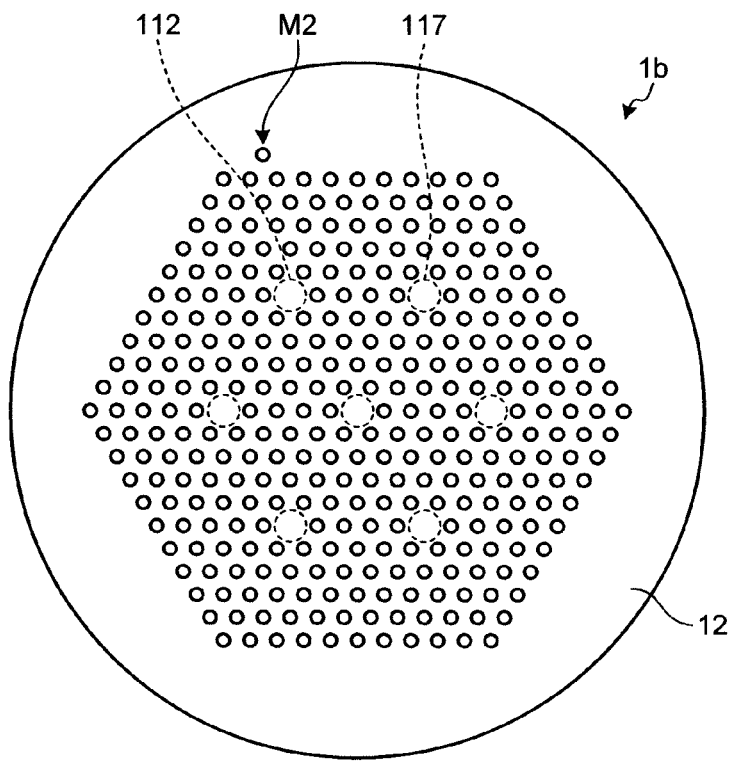
FIG. 3 is a cross-sectional view of a cross section opposed to the cross section illustrated in FIG. 2 when the multi-core HF illustrated in FIG. 2 is cut.

More specifically, if the multi-core HF 1b is cut, one of the cross section is as illustrated in FIG. 2, while the other cross section opposite thereto becomes, as illustrated in FIG. 3, mirror-symmetrical with respect to the cross section in FIG. 2, and thus the positions of the core portion 112 and the core portion 117 are interchanged. However, as illustrated in FIG. 3, the marker M2 is disposed so that its position changes from one cross section to a cross section opposite thereto and being its mirror image. As a result, in the multi-core HF 1b, the direction from the core portion 117 toward the core portion 112 is identifiable by the marker M2, and thus positions of the core portion 112 and the core portion 117 become more infallibly identifiable and positions of the other core portions also become more infallibly identifiable, facilitating the connection further.

(Second Modification)

Figure 4:
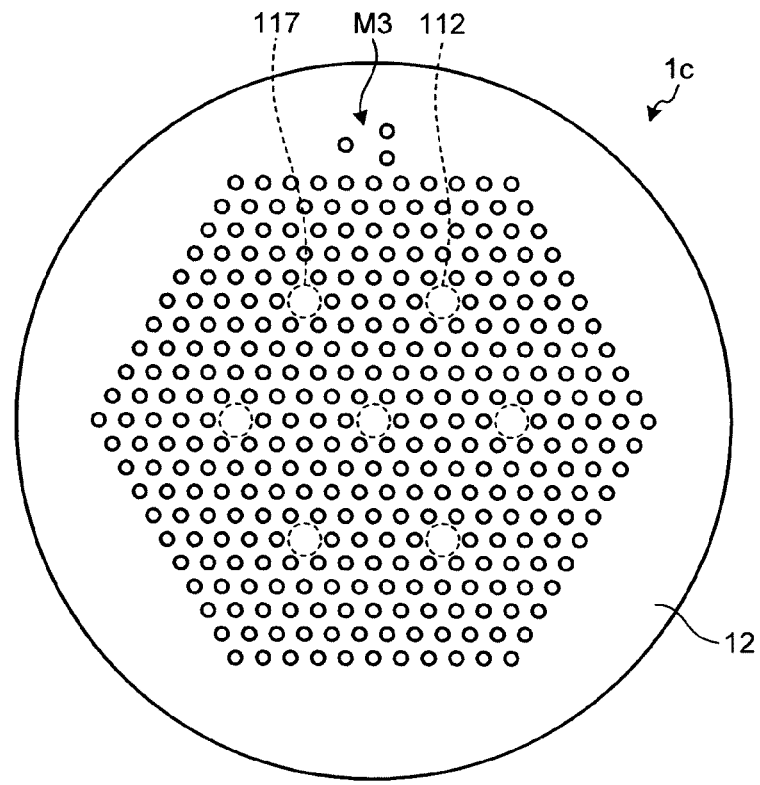
FIG. 4 is a schematic cross-sectional view of a multi-core HF according to a second modification.

FIG. 4 is a schematic cross-sectional view of a multi-core HF 1c according to a second modification. As illustrated in FIG. 4, the multi-core HF 1c has a configuration in which the marker M1 of the multi-core HF 1a illustrated in FIG. 1 is replaced with a marker M3. The marker M3 has three holes formed into a triangle, and is formed so as to specify a direction from the core portion 117 to the core portion 112. Therefore, in the multi-core HF 1c, similarly to the marker M2 of the multi-core HF 1b, a specific direction around the periphery of the cladding portion 12 becomes identifiable and the position of each core portion becomes more infallibly identifiable by the marker M3, facilitating the connection further.

(Third Modification)

Figure 5:
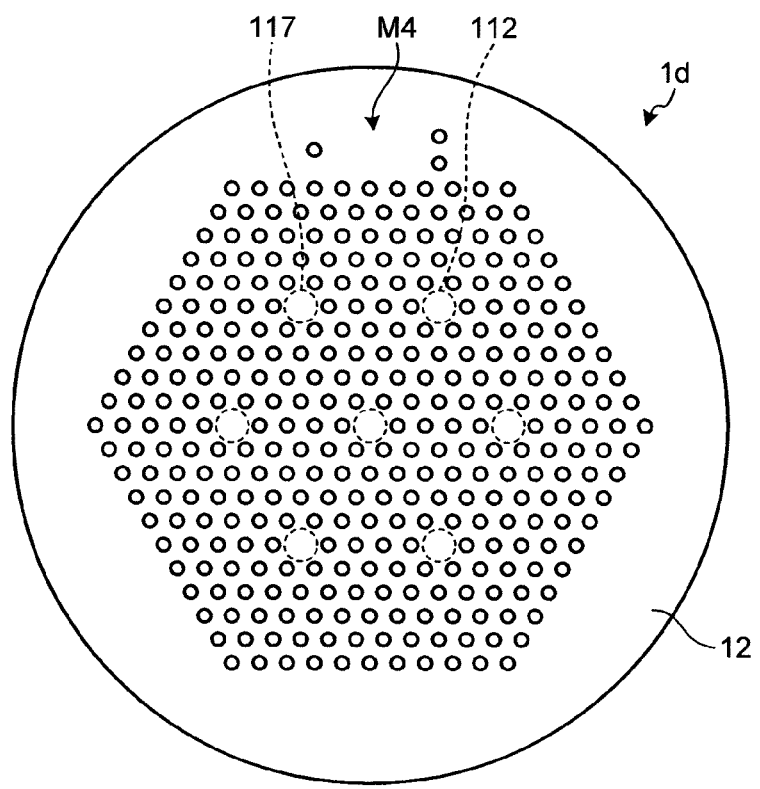
FIG. 5 is a schematic cross-sectional view of a multi-core HF according to a third modification.

FIG. 5 is a schematic cross-sectional view of a multi-core HF 1d according to a third modification. As illustrated in FIG. 5, the multi-core HF 1d has a configuration in which the marker M1 of the multi-core HF 1a illustrated in FIG. 1 is replaced with a marker M4. Similarly to the marker M3 of the multi-core HF 1c, the marker M4 also has three holes formed into a triangle so as to specify a direction from the core portion 117 to the core portion 112, but this triangle is elongated than that of the marker M3. Therefore, in the multi-core HF 1d, the position of each core portion is more infallibly identifiable by the marker M4, and the connection is facilitated even further.

(Fourth Modification)

Figure 6:
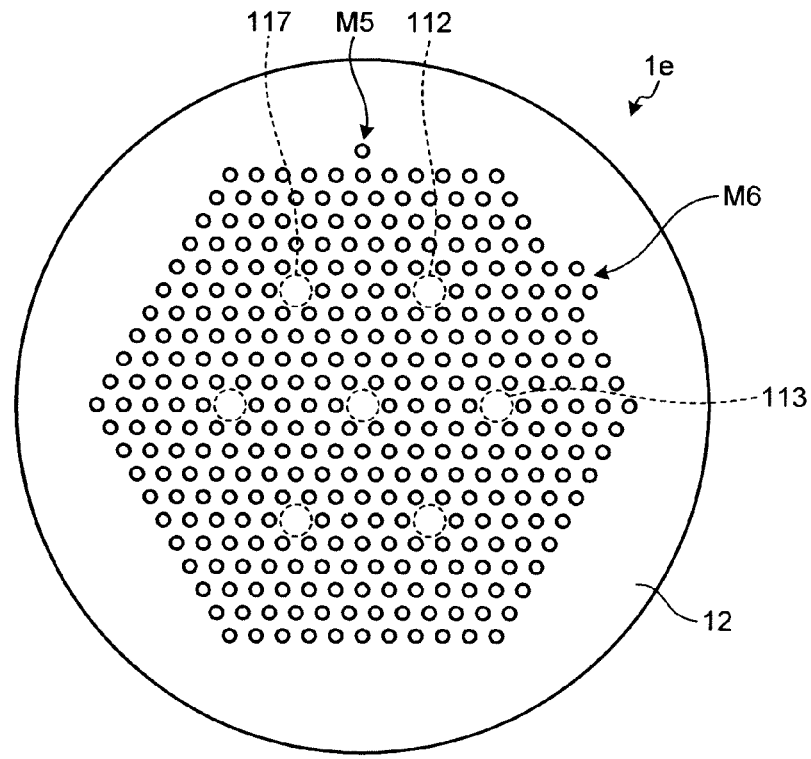
FIG. 6 is a schematic cross-sectional view of a multi-core HF according to a fourth modification.

FIG. 6 is a schematic cross-sectional view of a multi-core HF 1e according to a fourth modification. As illustrated in FIG. 6, the multi-core HF 1e has a configuration in which the marker M1 of the multi-core HF 1a illustrated in FIG. 1 is replaced with markers M5 and M6, which are holes. The marker M5 is located, similarly to the marker M1, at a position that is approximately equally distant from the core portion 112 and the core portion 117, while the marker M6 is located on the outer side of the core portion 112 and the core portion 113. As explained above, in this multi-core HF 1e, the markers M5 and M6 are arranged to face different sides of an equilateral-hexagonal area in which the holes 13 are formed, and thus the position of each core portion is more infallibly identifiable, and the connection is facilitated even further.

(Fifth Modification)

Figure 7:
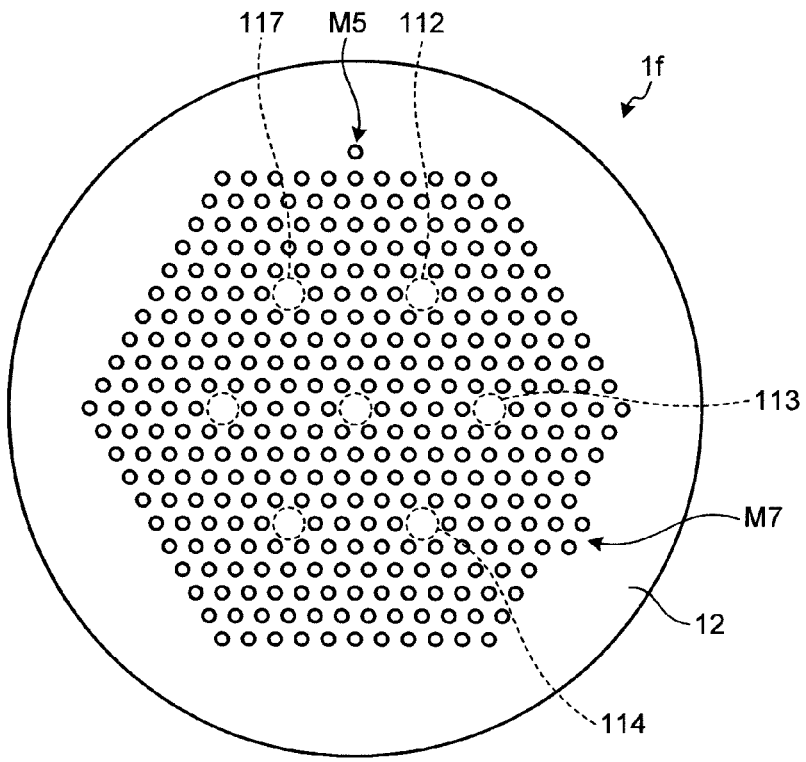
FIG. 7 is a schematic cross-sectional view of a multi-core HF according to a fifth modification.

FIG. 7 is a schematic cross-sectional view of a multi-core HF 1f according to a fifth modification. As illustrated in FIG. 7, the multi-core HF 1f has a configuration in which the marker M6 of the multi-core HF 1e illustrated in FIG. 6 is replaced with a marker M7, which is holes. The marker M7 is located on the outer side of the core portion 113 and the core portion 114. In the multi-core HF 1f, similarly to the multi-core HF 1e, the markers M5 and M7 are arranged to face different sides of an equilateral-hexagonal area in which the holes 13 are formed, and thus the position of each core portion is more infallibly identifiable, and the connection is facilitated even further.

(Sixth Modification)

Figure 8:
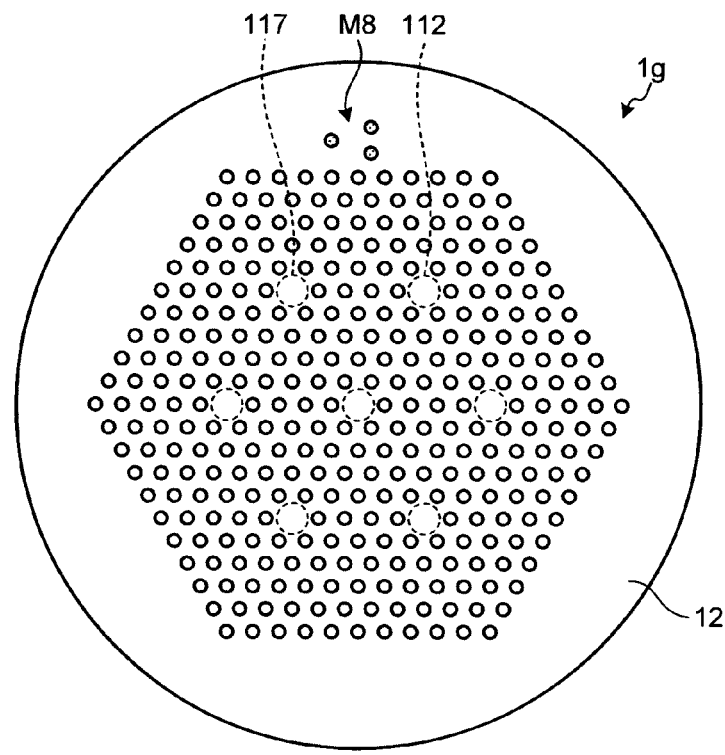
FIG. 8 is a schematic cross-sectional view of a multi-core HF according to a sixth modification.

FIG. 8 is a schematic cross-sectional view of a multi-core HF 1g according to a sixth modification. As illustrated in FIG. 8, the multi-core HF 1g has a configuration in which the marker M3 of the multi-core HF 1c illustrated in FIG. 4 is replaced with a marker M8. The marker M8 is formed of three silica-based glass portions made of silica-based glass doped with a material having a refractive index different from that of the cladding portion 12, for example, doped with germanium, which increases the refractive index, or fluorine, which decreases the refractive index, and is formed into an approximate isosceles triangle so as to specify a direction from the core portion 117 to the core portion 112. As a result, in the multi-core HF 1g, by the marker M8, a specific direction around the periphery of the cladding portion 12 is identifiable, the position of each core portion is more infallibly identifiable, and the connection is facilitated even further.

When ordinary optical fibers are fusion spliced, an end face of an optical fiber is irradiated with light from a lateral side, the light transmitted through the optical fiber is imaged, and a position of a core portion is identified based on shading produced by a refractive-index difference between the core portion and the cladding portion on the picked-up image. In the multi-core HF 1g also, similarly to the ordinary optical fibers, a position of the marker M8 is identified based on shading produced by a refractive-index difference between the marker M8 and the cladding portion 12 on an image imaged by irradiating light from a lateral side, and the position of each core portion is identifiable based on the identified position.

Next, a method of manufacturing multi-core HFs 1a to 1g according to the first embodiment and the first to sixth modifications will be explained below. The multi-core HFs 1a to 1g may be manufactured using a well-known drill method, sol-gel method, or stack-and-draw method. When the stack-and-draw method is used, the following is performed. In, for example, a pure silica-based glass tube, solid pure silica-based glass rods to become core portions are placed, hollow pure silica-based glass capillaries to form holes are placed around the glass rods, and solid pure silica-based glass rods are filled into space between the glass tube and the glass capillaries, to produce a glass preform. When this is performed, one or more of the glass rods to be filled therein, which corresponds/correspond to a position where a marker is to be formed is/are replaced with a hollow pure silica-based glass capillary/capillaries, or with a silica-based glass rod/ rods doped with germanium, fluorine, or the like. Thereafter, by drawing the glass preform, the multi-core HFs 1a to 1g is able to be manufactured.

Second Embodiment

Next, a second embodiment of the present invention will be explained below. A multi-core optical fiber according to the second embodiment is of a type having a refractive-index difference between core portions and a cladding portion and light is confined to the core portions by this refractive-index difference.

Figure 9:
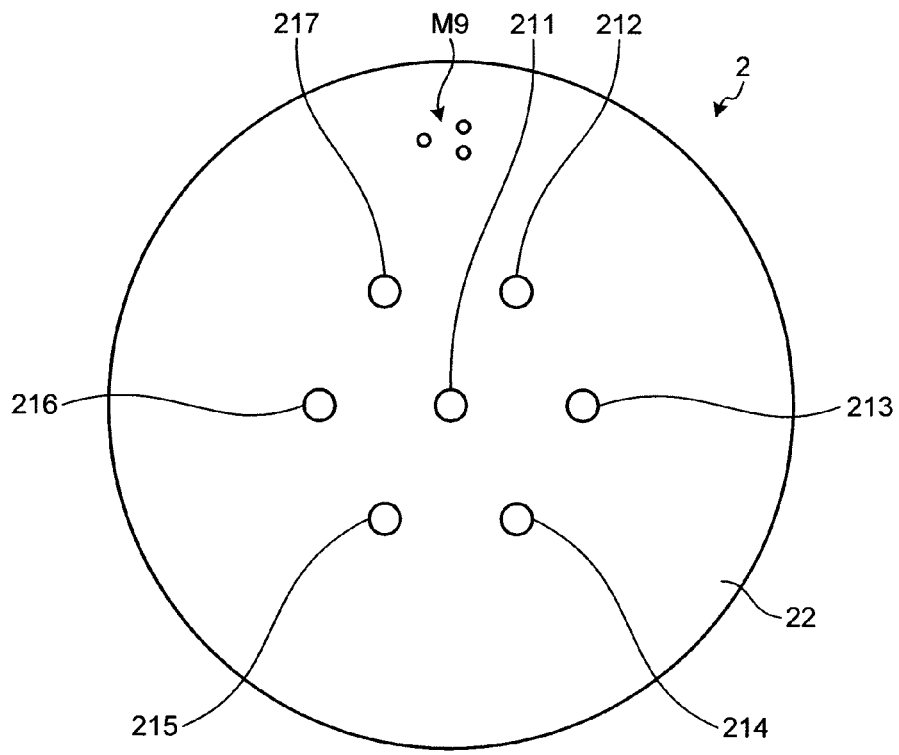
FIG. 9 is a schematic cross-sectional view of a multi-core optical fiber according to a second embodiment.

FIG. 9 is a schematic cross-sectional view of a multi-core optical fiber according to the second embodiment. As illustrated in FIG. 9, a multi-core optical fiber 2 includes core portions 211 to 217 which are disposed separated from each other and a cladding portion 22 around the core portions 211 to 217. The core portion 211 is arranged at an approximate center portion of the cladding portion 22, and the core portions 212 to 217 are arranged at respective apexes of an equilateral hexagon around the core portion 211. Each separated distance between the core portions 212 to 217 and the core diameters of the core portions 211 to 217 are not particularly limited. Each separated distance may be, for example, approximately 60 µm and the core diameter may be about 5.0 µm to 10.0 µm. Each of the core portions 211 to 217 is made of silica-based glass doped with germanium, and the cladding portion 12 is made of pure silica glass. As a result, the cladding portion 22 has a refractive index lower than a refractive index of each of the core portions 211 to 217, and a relative refractive-index difference of each of the core portions 211 to 217 with respect to the cladding portion 22 is approximately 0.3% to 1.5%. The multi-core optical fiber 2 confines the light to each of the core portions 211 to 217 by this refractive-index difference to propagate the light.

Moreover, in the multi-core optical fiber 2, the cladding portion 22 includes a marker M9 formed on an outer side of the core portion 212 and the core portion 217. The marker M9 has three holes formed into an approximate isosceles triangle, similarly to the marker M3 in the multi-core HF 1c, so as to specify a direction from the core portion 217 to the core portion 212. As a result, also in the multi-core optical fiber 2, by the marker M9, a specific direction around the periphery of the cladding portion 22 is identifiable and the position of each of the core portions 212 to 217 is more infallibly identifiable, facilitating the connection even further.

This multi-core optical fiber 2, similarly to the multi-core HFs 1a to 1g, may be manufactured using a well-known drill method, sol-gel method, or stack-and-draw method. When the stack-and-draw method is used, in the manufacturing method, the pure silica-based glass capillaries are replaced with solid glass rods, and the glass rods to become core portions are made of silica-based glass doped with germanium of a predetermined amount.

The multi-core HFs 1a to 1f according to the first embodiment or the modifications thereof include the markers M1 to M7, which are holes, in addition to the holes 13 for confining the light to the core portions 111 to 117, but part of the holes 13 may serve also as the marker. In this case, the hole 13 to be the marker shall be a hole separated from the core portions 111 to 117 as much as possible so as not to affect confinement of the light to the core portions 111 to 117, and a radius of this hole or a disposed position of the hole may be changed so that the hole is identifiable from the other holes 13.

In the multi-core HFs 1a to 1f according to the first embodiment or the modifications thereof, or in the multi-core optical fiber 2 according to the second embodiment, the markers, which are holes, may be replaced with a marker made of a material having a refractive index different from that of the cladding portions.

Each of the first or the second embodiments, or the modifications thereof is just an example, and thus, the number and arrangement of the core portions, the holes for confining the light to the core portions, and the markers are not particularly limited. Furthermore, the material of the multi-core optical fiber is not particularly limited. Hereinafter, further modifications and embodiments will be explained.

(Seventh Modification)

Figure 10:
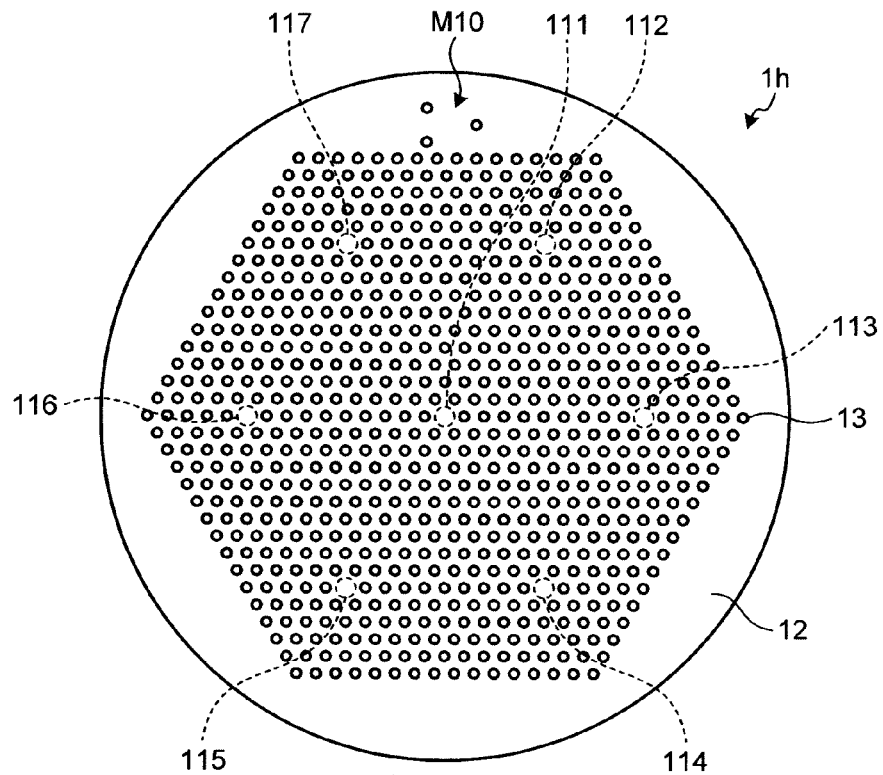
FIG. 10 is a schematic cross-sectional view of a multi-core HF according to a seventh modification.

FIG. 10 is a schematic cross-sectional view of a multi-core HF 1h according to a seventh modification. As illustrated in FIG. 10, the multi-core HF 1h has a configuration in which the number of holes 13, in the multi-core HF 1a illustrated in FIG. 1, between the core portion 111 and each of the core portions 112 to 117 is increased from 4 to 9 and the marker M1 is replaced with a marker M10. In the multi-core HF 1h, each separated distance between the core portions 111 to 117 is longer than that in the multi-core HF 1a or the like, and thus, degradation by crosstalk of optical signals transmitted through the core portions 111 to 117 is suppressed, and a specific direction around the periphery of the cladding portion 12 is identifiable by the marker M10, facilitating the connection further.

Third Embodiment

Figure 11:
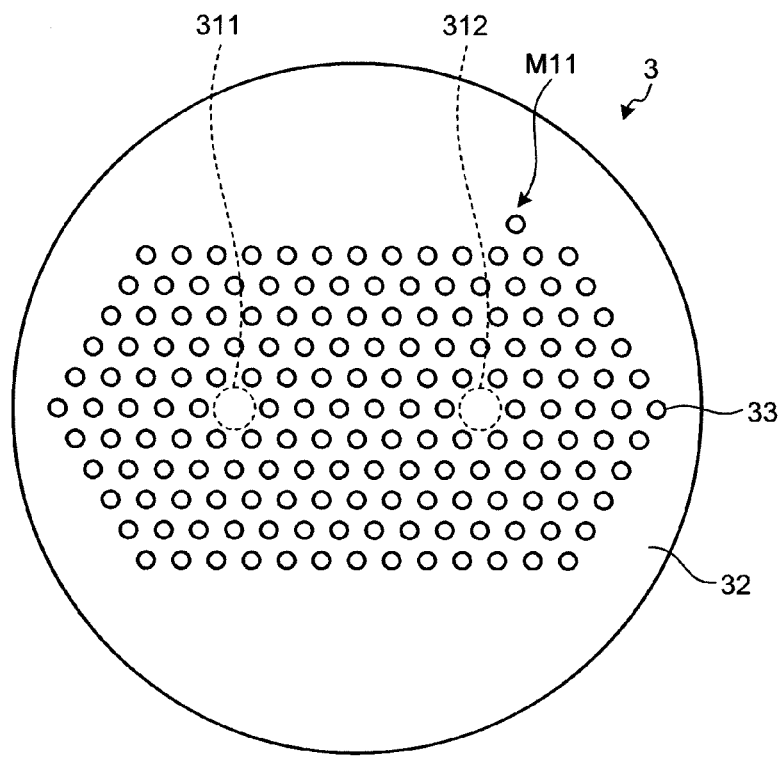
FIG. 11 is a schematic cross-sectional view of a multi-core optical fiber according to a third embodiment.

FIG. 11 is a schematic cross-sectional view of a multi-core HF 3 according to a third embodiment of the present invention. As illustrated in FIG. 11, the multi-core HF 3 includes two core portions 311 and 312 and a cladding portion 32 provided around the core portions 311 and 312. The core portions 311 and 312 and the cladding portion 32 are made of silica-based glass such as pure silica glass.

The cladding portion 32 includes a plurality of holes 33 arranged around the core portions 311 and 312. The holes 33 are arranged, similarly to the holes 13 in the multi-core HF 1a or the like, to form a triangular lattice, and form an equilateral-hexagonal layer so as to surround each of the core portions 311 and 312. Moreover, each of the core portions 311 and 312 is surrounded by holes 33 of at least five layers. Although diameters of the holes 33 and a lattice constant of the triangular lattice are not particularly limited, they may be the same as those of, for example, the multi-core HF 1a. Furthermore, the cladding portion 32 includes a marker M11, which is a hole located outside an area in which the holes 33 are formed and at a position closer to the core portion 312 than to the core portion 311. In the multi-core HF 3 also, a specific direction around the periphery of the cladding portion 32 is identifiable by the marker M11, and thus the connection is further facilitated.

Fourth Embodiment

Figure 12:
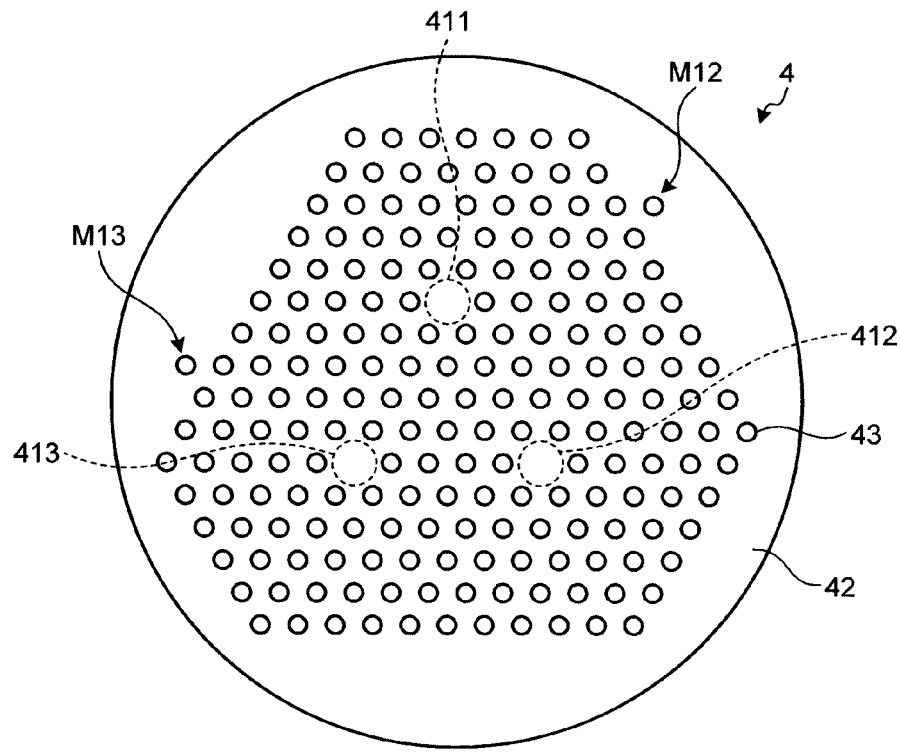
FIG. 12 is a schematic cross-sectional view of a multi-core optical fiber according to a fourth embodiment.

FIG. 12 is a schematic cross-sectional view of a multi-core HF 4 according to a fourth embodiment of the present invention. As illustrated in FIG. 12, the multi-core HF 4 includes three core portions 411 to 413 and a cladding portion 42 around the core portions 411 to 413. The core portions 411 to 413 and the cladding portion 42 are made of silica-based glass such as pure silica glass.

The cladding portion 42 includes a plurality of holes 43, similar to the holes 13 in the multi-core HF 1a or the like, which are arranged to form a triangular lattice around the core portions 411 to 413. Furthermore, the cladding portion 42 includes markers M12 and M13 arranged to face different sides of a polygonal area in which the holes 43 are formed. In the multi-core HF 4 also, a specific direction around the periphery of the cladding portion 42 is identifiable by the markers M12 and M13, and thus the connection is further facilitated.

Fifth Embodiment

Figure 13:
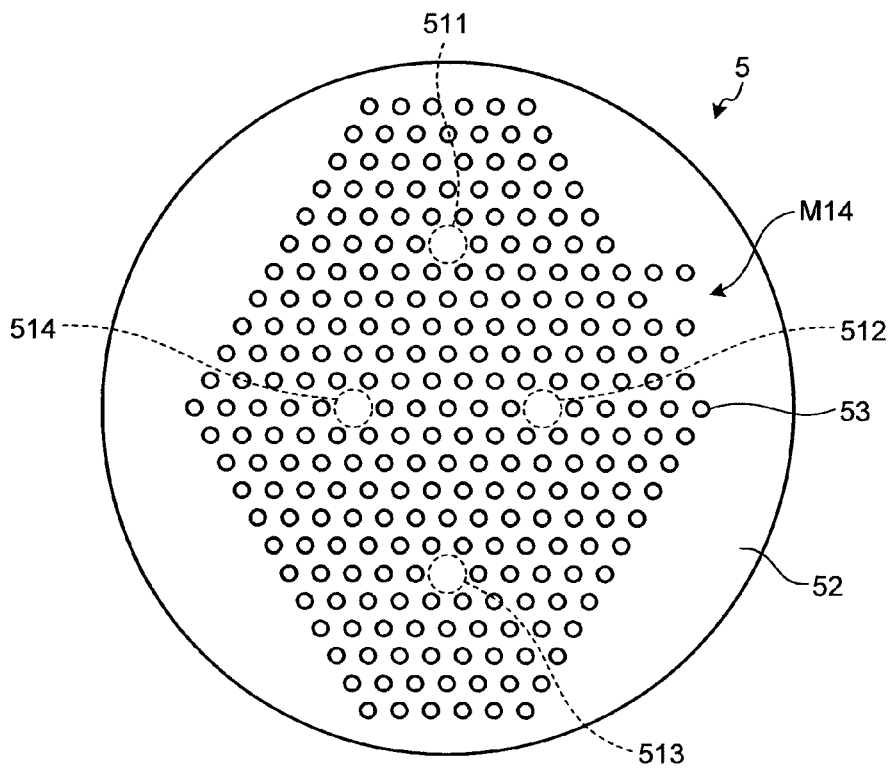
FIG. 13 is a schematic cross-sectional view of a multi-core optical fiber according to a fifth embodiment.

FIG. 13 is a schematic cross-sectional view of a multi-core HF 5 according to a fifth embodiment of the present invention. As illustrated in FIG. 13, the multi-core HF 5 includes four core portions 511 to 514 and a cladding portion 52 positioned around core portions 511 to 514. The core portions 511 to 514 and the cladding portion 52 are made of silica-based glass such as pure silica glass.

The cladding portion 52 includes a plurality of holes 53, similar to the holes 13 in the multi-core HF 1a or the like, which are arranged to form a triangular lattice around the core portions 511 to 514. Furthermore, the cladding portion 52 includes a marker M14 having three holes formed into a triangle, which is arranged outside an area in which the holes 53 are formed and on an outer side of the core portion 511. In the multi-core HF 5 also, a specific direction around the periphery of the cladding portion 52 is identifiable by the marker M14, and thus the connection is further facilitated.

The present invention may be applied to a multi-core optical fiber configured as illustrated in FIG. 9, in which core portions are arranged similarly to the multi-core HFs illustrated in FIGS. 11 to 13, to arrange a marker as appropriate.

First and Second Examples

As first and second examples of the present invention, multi-core optical fibers were manufactured, which confine light to core portions by a refractive-index difference between the core portions and a cladding portion, by using the stack-and-draw method, similarly to the multi-core optical fiber according to the second embodiment.

Specifically, first, in a pure silica-based glass tube, core portions having a diameter of 7 mm and which have been doped with germanium so that a relative refractive-index difference with respect to pure silica becomes 0.3%, and solid silica-based glass rods forming a cladding portion about four times each core portion around the core portions, are placed in an equilateral hexagonal shape and at the center of this equilateral hexagon, and a space between the glass tube and the glass rods is filled with a large number of solid pure silica-based glass rods, to produce a glass preform. The diameter of the glass preform (that is, the diameter of the pure silica-based glass tube) was 24 mm in the first example and 36 mm in the second example.

When the glass rods were filled in, glass rods at positions where markers were to be formed were replaced with hollow pure silica-based glass capillaries. The positions where the markers were to be formed, similarly to the multi-core optical fiber according to the fifth modification illustrated in FIG. 7, faced two different sides of the equilateral hexagon formed by the core portions, and one or two holes were arranged at each position. Thereafter, the glass preform was drawn to manufacture the multi-core optical fibers according to the first and the second examples.

Figure 14:
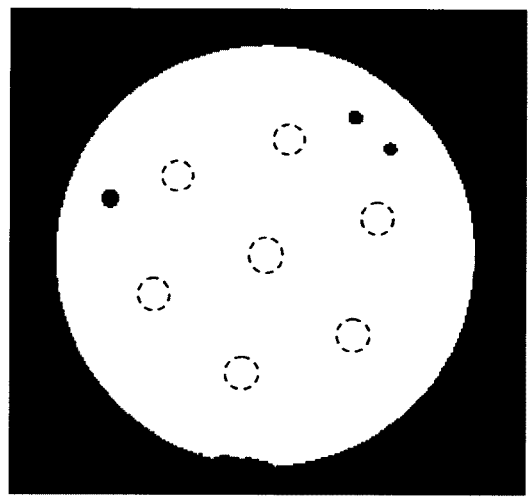
FIG. 14 is a cross-sectional photograph of a multi-core optical fiber according to a first example.
Figure 15:
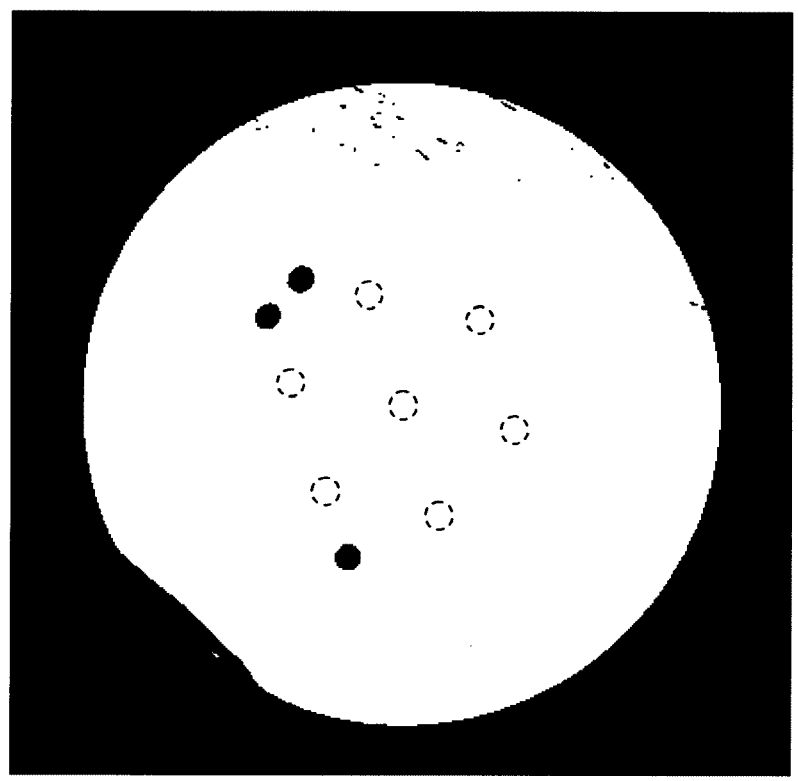
FIG. 15 is a cross-sectional photograph of a multi-core optical fiber according to a second example.

FIG. 14 is a cross-sectional photograph of the multi-core optical fiber according to the first example. FIG. 15 is a cross-sectional photograph of the multi-core optical fiber according to the second example. In FIGS. 14 and 15, circular areas surrounded by dotted lines represent positions of the core portions. Solid circles represent the markers. Furthermore, in both the first and the second examples, the core diameter is approximately 10 μm, and a separated distance between the cores is approximately 40 μm. An outer diameter of the multi-core optical fiber is 141 μm in the first example, and 215 μm in the second example.

As illustrated in FIGS. 14 and 15, in the multi-core optical fibers according to the first and the second examples, a specific direction around the periphery of the cladding portion is identifiable and the position of each core portion is more infallibly identifiable, further facilitating the connection. Moreover, like the multi-core optical fibers according to the first and the second examples, even if the number of cores, the diameter of the cores, and the separated distance between the cores are the same, by changing the diameter of the glass tube, multi-core optical fibers of different diameters are easily obtainable.

According to an embodiment of the present invention, it is possible to easily identify a position of a specific core portion, and thus there is an effect that it is possible to realize a multi-core optical fiber that is easily connected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-core optical fiber, comprising:
   a plurality of core portions; and
   a cladding portion positioned around the plurality of core portions and including a plurality of markers for identifying a position of a specific one of the plurality of core portions, wherein
   the markers are formed so that a specific direction around a periphery of the cladding portion is identifiable by an arrangement of the markers, and each of distances of the markers from a center of the multi-core fiber in a cross-section is longer than a distance of a farthest core portion from the center of the multi-core fiber in the cross-section.

2. The multi-core optical fiber according to claim 1, wherein the cladding portion comprises a plurality of holes that are arranged around the plurality of core portions and that are configured to confine light to each of the plurality of core portions.

3. The multi-core optical fiber according to claim 1, wherein
   the cladding portion has a refractive index lower than a refractive index of each of the plurality of core portions, and
   light is confined to each of the plurality of core portions by a refractive-index difference between the cladding portion and each of the plurality of core portions.

4. The multi-core optical fiber according to claim 1, wherein each of the plurality of markers comprises a hole formed in the cladding portion.

5. The multi-core optical fiber according to claim 1, wherein the plurality of markers are made of a material having a refractive index different from that of the cladding portion.

* * * * *